Figure 1:
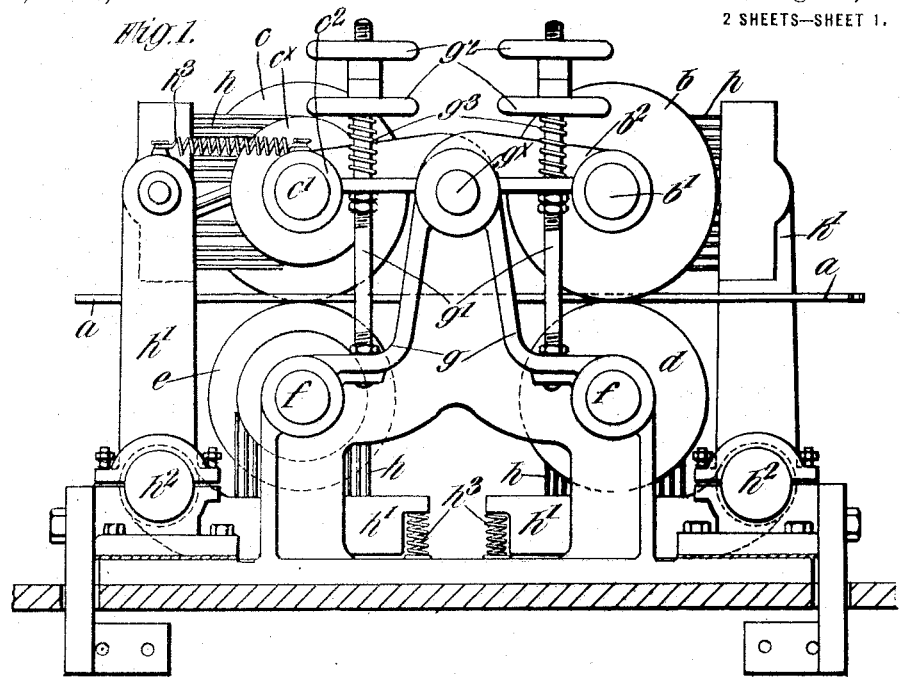

F. J. KEEGAN.
MANUFACTURE OF WHEEL RIMS.
APPLICATION FILED APR. 30, 1913.

1,195,592.

Patented Aug. 22, 1916.
2 SHEETS—SHEET 1.

Witnesses:
M. A. Bill
C. B. Schroeder

Inventor:
Frank J. Keegan
By
Pennie Davis & Gladstone
Attys.

F. J. KEEGAN.
MANUFACTURE OF WHEEL RIMS.
APPLICATION FILED APR. 30, 1913.
1,195,592.
Patented Aug. 22, 1916.
2 SHEETS—SHEET 2.
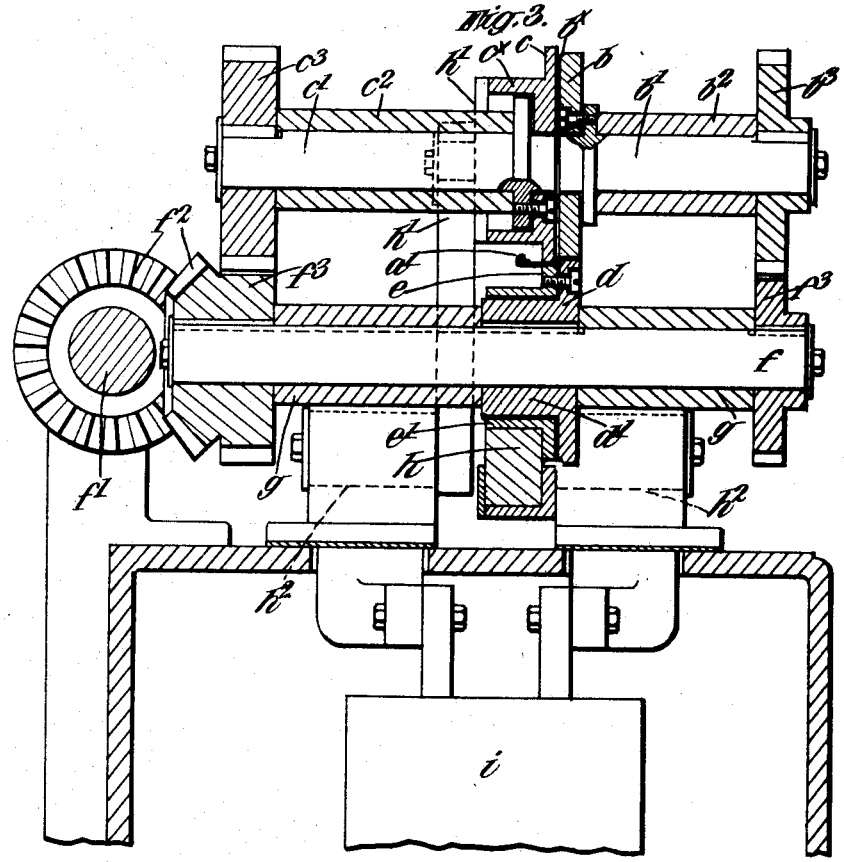
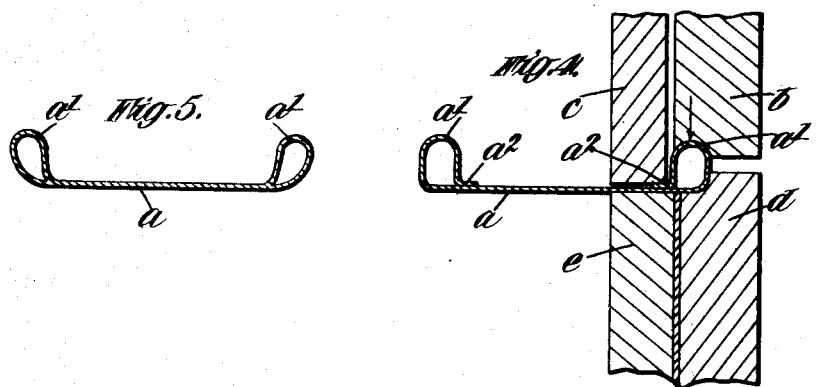
Witnesses:
M. A. Bill
O. B. Schroeder
Inventor:
Frank J. Keegan
By Pennie Davis & Goldsborough
Attys.

UNITED STATES PATENT OFFICE.

FRANK JOHN KEEGAN, OF COVENTRY, ENGLAND, ASSIGNOR TO THE DUNLOP RUBBER COMPANY, LIMITED, OF COVENTRY, ENGLAND.

MANUFACTURE OF WHEEL-RIMS.

1,195,592.     Specification of Letters Patent.     Patented Aug. 22, 1916.

Application filed April 30, 1913. Serial No. 764,475.

*To all whom it may concern:*

Be it known that I, FRANK JOHN KEEGAN, a citizen of the United States of America, residing at Alma street, Coventry, in the county of Warwick, England, have invented certain new and useful Improvements in or Relating to the Manufacture of Wheel-Rims, of which the following is a specification.

This invention relates to the manufacture of wheel rims having tubular or beaded edges and has particular reference to the method of manufacture and to apparatus employed wherein a flat strip of metal is passed between a series of sectioning rolls which turn over the edges of the strip to form the tubular portions, the extreme edges being superposed above or overlapping the main or middle part of the strip so that the overlapping portions or edges may be welded to the main part of the strip by passing between welding rolls, after which, the strip is given its final cross sectional form by being passed between further sectioning rolls.

Heretofore difficulty has been experienced in obtaining a proper closure or contact of the overlapping edges with the main or middle portion of the strip, with the result that an unsatisfactory welding or uniting of the parts is obtained. Moreover it is found that the welding rolls which have heretofore been arranged to press the said portions to be welded into contact with each other quickly become worn or damaged at the peripheral parts which contact with the rim strip and frequently have to be replaced by fresh rolls.

The chief object of the present invention is to obviate the above defects so that a more satisfactory welding or uniting of the overlapping portion to the main or middle portion of the rim strip is effected and damage to the welding rolls is prevented thus prolonging the life of the latter.

According to this invention mechanical pressure is applied to the partially formed tubular edges of the strip so as to press or force the superposed or overlapping portion of the strip in contact with the main or middle part thereof so that the welding can be effected without the necessity of directly exerting mechanical pressure on the said overlapping portion. For this purpose the tubular portion of the rim strip may be so shaped that when mechanical pressure is exerted or applied to the upper curved part of the tubular edge the overlapping portions are firmly held or pressed in contact with the main or middle part of the rim. After the welding operation has been effected the tubular edges and the middle part of the rim may be formed to the required shape by being passed between further sectioning rolls or the like.

The apparatus which I may employ for carrying out this invention comprises a pressure device preferably in the form of a roll which is adapted to bear on the upper curved portion of the tubular edge of the rim strip to press the superposed or overlapping portion firmly in contact with the main or middle part of the rim strip as aforesaid. The welding of the said overlapping part to the main part of the rim strip is effected while the said parts are thus pressed in contact preferably by means of electrodes in the form of rolls of electrical conducting material which bear lightly upon and supply the current to the parts to be welded. The pressure and welding rolls may be arranged between two sets of sectioning rolls so that a continuous operation is performed. The rim strip after leaving suitable sectioning rolls is passed between upper and lower pressure and welding rolls, the upper pressure rolls being adapted to force the rim strip into contact with the lower pressure rolls. The upper pressure and welding rolls may be carried by separate rotatable shafts which are mounted in swinging brackets capable of independent adjustment with respect to the lower rolls which need not be adjustable, as their chief function is to act as supports or the like against which the rim strip is forced into contact by the adjustable upper pressure rolls. Each lower pressure roll and welding roll may therefore be constructed as one element, that is to say the pressure roll may be such that it carries an electrical conducting material to which current flows from the upper welding roll after passing through the portions of the rim strip to be welded.

In order that the said invention may be clearly understood and readily carried into effect, I will describe the same more fully with reference to the accompanying drawings in which:—

Figure 2:
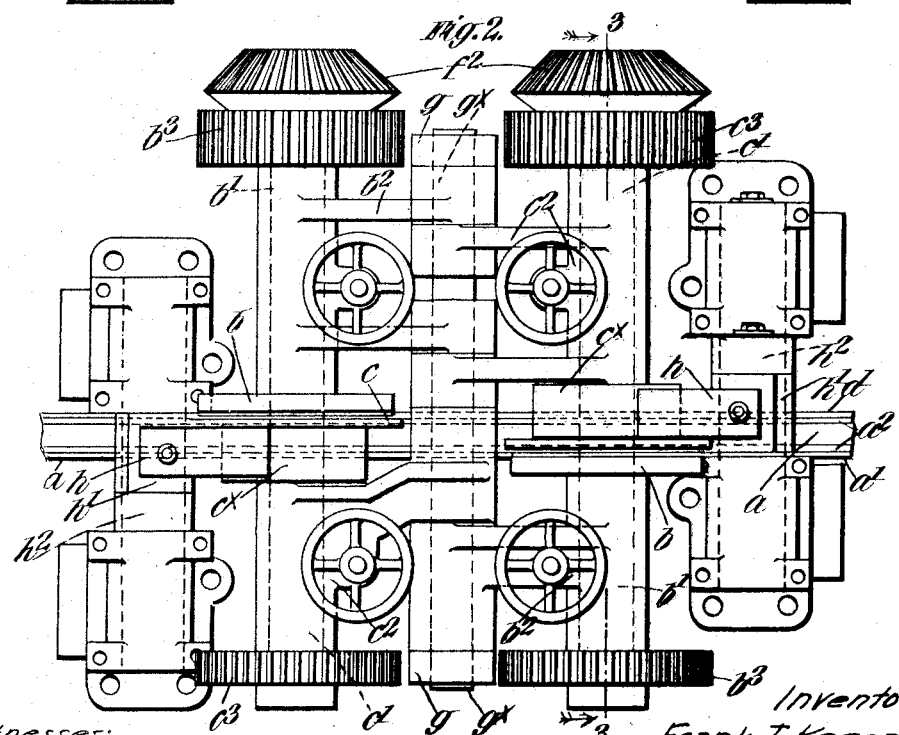

Figure 1 is a side elevation of a preferred construction of the improved electrical welding apparatus showing the rim strip in the position it assumes in passing through the apparatus. Fig. 2 is a plan view of Fig. 1. Fig. 3 is a vertical section on the line 3—3 of Fig. 2 looking in the direction of the arrows. Fig. 4 is an enlarged sectional view showing a portion of the welding and pressure rolls bearing upon the rim strip, and Fig. 5 is a cross sectional view of the rim strip showing its formation after leaving the welding apparatus and further sectioning rolls.

Like letters of reference denote similar parts in all the figures.

$a$ is the rim strip; $b$ $b$ are the upper pressure rolls, $c$ $c$ the upper welding rolls, and $d$ $d$ the lower pressure rolls each of which latter carries a welding roll or the like $e$ $e$. In the example shown, there is a set of upper pressure and welding rolls arranged to act upon each edge of the rim strip and immediately beneath each set the lower pressure and welding rolls are disposed. The upper pressure rolls $b$ $b$ bear upon the partially formed tubular edges $a'$ of the rim strip and for this purpose are each provided with a peripheral recess $b^x$ which engages with the upper portion of the said partially formed tubular edge; each of the upper welding rolls $c$ is arranged to bear on the overlapping portion $a^2$ of the rim strip at the point where the welding is to take place. The lower pressure rolls $d$ $d$ are shaped to correspond to the shape of the edge of the rim strip and the lower welding rolls $e$ $e$ are arranged immediately beneath the upper welding rolls.

In the example shown, each lower pressure roll $d$ is provided with a boss $d'$ (see Fig. 3) on which is mounted a sleeve or boss $e'$ of the lower welding rolls $e$, the latter being entirely insulated from the pressure roll $d$ and secured thereto by set screws which are also insulated from the pressure roll. Each of the combined lower pressure and welding rolls is keyed to a transverse shaft $f$ mounted in a pair of frames $g$ having suitable bearings to enable the shafts $f$ to rotate freely. The said frames extend upwardly to support a transverse shaft $g^x$ on which are pivotally mounted a number of swinging brackets $b^2$, $b^2$, $c^2$, $c^2$ supporting at their outer ends, separate shafts $b'$, $b'$, $c'$, $c'$ carrying the upper pressure and welding rolls. Each upper pressure roll is secured to its shaft $b'$ in an insulated manner by set screws engaging a collar or the like on the shaft $b'$ and the welding rolls $c$ are similarly mounted on their shafts $c'$. The shafts $b'$ and $c'$ are quite separate and independent and are rotatably mounted in suitable bearings in the swinging brackets $b^2$ $b^2$ as shown in Fig. 2. Each bracket is capable of independent movement to enable the adjustment of the upper rolls with relation to the rim strip to be effected, and a convenient adjusting device for each bracket may comprise a vertical rod $g'$ mounted at one end on the frame $g$ and carrying a hand wheel $g^2$ on a screw thread so that the hand wheel may bear on the bracket preferably through a spring $g^3$.

The rotation of the various shafts $f$ $b'$ $c'$ carrying the pressure and welding rolls is, in the example shown, effected from a main operating shaft $f'$ through bevel gearing $f^2$, and each of the shafts $f$ $f$ has mounted thereon, spur wheels $f^3$ $f^3$ which engage with spur wheels $b^3$ $c^3$ mounted on the shafts $b'$ and $c'$ respectively. The electrical current is supplied to the welding rolls through brushes $h$ contacting with the bosses $c^x$ $e'$ of the said upper and lower welding rolls $e$ $e$ respectively which brushes are suitably connected with the current supply preferably through transformers $i$, and are carried by arms $h'$ pivoted on the shafts $h^2$ each of which arms is under the influence of a spring $h^3$ so that the brushes $h$ can be retained in good electrical contact with the welding rolls. The electrical connections are such that the current flows from the upper roll through the rim strip and returns through the lower roll.

In order that the rim strip may be satisfactorily welded it is preferably given a cross sectional formation as shown in Fig. 4 so that the upper pressure roll is able to bear upon the upper or curved part of the partially formed tubular edge $a'$ and thus force the overlapping portion $a^2$ of the rim strip firmly into contact with the main or middle part of the strip. The upper welding roll bears comparatively lightly on the overlapping portion and the pressure thereof and also the pressure of the pressure roll $b$ can be regulated as desired by the hand wheel. After the rim strip has been welded it may be again passed between sectioning rolls which impart to the tubular edges $a'$ a more pronounced curve at the lower part than exists on the strip prior to its entry into the welding apparatus.

What I claim and desire to secure by Letters Patent of the United States is:—

1. In a method of manufacturing wheel rims having tubular edges, bending the edges of the rim or rim strip into partially formed tubular edges each having a superposed portion which is to be welded to the main or middle part of the strip, applying mechanical pressure to the said partially formed tubular edges so as to press the superposed portions into contact with the main or middle part of the rim or rim strip, and effecting the welding of the said superposed portion to the main part of the rim or rim strip without exerting considerable mechanical pressure on said superposed portion.

2. In a method of manufacturing wheel rims having tubular edges, bending the edges to form the curved or tubular portion and an overlapping portion lying above the middle or main part of the strip, applying mechanical pressure to said curved or tubular portion to force said overlapping portion in contact with the middle part of the strip and effecting the welding of said overlapping portion to said middle part without exerting considerable mechanical pressure at that point.

3. In a method of manufacturing wheel rims having tubular edges, forming each of said edges with a curved upper portion and outer and inner walls which are perpendicular or at right angles to the middle or main part of the rim strip and bending the extremity or edge of said inner wall at right angles so as to be approximately parallel to said middle portion, applying mechanical pressure to the upper portion of the tubular edge, effecting the welding of the bent extremity of the inner wall without exerting considerable mechanical pressure on said extremity, and finally imparting the desired or final cross section to the said rim strip.

4. Apparatus for welding a rim strip having a tubular edge portion with the edge of the strip overlying the main portion of the strip, comprising means for exerting pressure on the crown of said tubular edge portion and in a direction normal to the rim strip to hold said overlying edge in contact with the main portion of the strip, and separate means for welding such overlying edge to the main portion of the strip without exerting considerable mechanical pressure at the welding point.

5. Apparatus for carrying out the hereinbefore described method, comprising in combination, a pressure device adapted to bear on a partially formed tubular edge of a rim strip, an electrical welding roll adapted to unite a portion of said tubular edge to the main portion of the rim strip arranged parallel to and coincident with said pressure roll, and means for supplying electrical current to said welding roll.

6. Apparatus for carrying out the hereinbefore described method comprising in combination, an upper pressure roll, a separate electrical welding roll, a lower pressure roll situated directly under said pressure roll, and a lower electrical welding roll, carried by said lower pressure roll and arranged directly under said upper welding roll.

7. Apparatus for carrying out the hereinbefore described method comprising in combination, rotary pressure rolls, pivoted brackets supporting said pressure rolls, rotary welding rolls separate from said pressure rolls, separate pivoted brackets supporting said welding rolls, and means for independently adjusting the position of said brackets.

8. Apparatus for carrying out the hereinbefore described method comprising in combination, two upper sets of independently movable pressure and welding rolls, a separate rotary shaft for each pressure and welding roll, the shafts for each pressure and welding roll being disposed in the same vertical plane, and lower pressure and welding rolls situated directly under said upper pressure rolls.

9. Apparatus for carrying out the hereinbefore described method comprising in combination, a supporting member, brackets pivoted on said member, two on each side thereof, a shaft carried by each of the brackets, pressure and welding rolls secured to the two shafts on both sides of the said member, a lower shaft directly under the said two shafts on each side of said member, a pressure and welding roll secured to each of said lower shafts, and means for imparting movement to said shafts and rolls carried thereby.

10. Apparatus for carrying out the hereinbefore described method comprising in combination, welding rolls, pressure rolls movable independently of the welding rolls, electrical brushes for the latter, movable members carrying said brushes, and means engaging said members whereby the brushes are retained in contact with the peripheries of the welding rolls.

11. Apparatus of the kind described comprising means for so forming tubular edge portions on a strip of material that each edge of the strip overlies the intermediate portion of the strip, each tubular edge portion being of such cross-sectional shape that pressure upon the crown thereof will force the overlying edge into contact with said intermediate portion of the strip, pressure devices for exerting pressure on the crown of said tubular edge portions, separate means for welding said overlying edges to the strip, and means for altering the cross-sectional shape of the tubular edge portions after welding to bring them to the desired final form.

12. Apparatus of the kind described comprising a series of sectioning rolls adapted to so form tubular edge portions on a strip of material that each edge of the strip lies over and abuts the intermediate portion of the strip, each tubular portion of the strip being of such cross-sectional shape that pressure upon the crown thereof will force the overlying edge into contact with said intermediate portion of the strip, means for exerting pressure on the crown of said tubular edge portions, separate means for welding said overlying edges to the strip, and a series of sectioning rolls for altering the cross-sectional shape of the tubular edge portions after welding to bring them to the desired final form.

In testimony whereof I affix my signature in presence of two witnesses:

FRANK JOHN KEEGAN.

Witnesses:
ERNEST HARKER,
ETHEL M. WELLS.

Copies of this patent may be obtained for five cents each, by addressing the "Commissioner of Patents, Washington, D. C."